United States Patent [19] | [11] 4,110,148
Rocholl | [45] Aug. 29, 1978

[54] APPARATUS FOR RAPIDLY PRODUCING CEMENTED PANES OF INSULATING GLASS

[75] Inventor: Martin-Gottfried Rocholl, Heidelberg, Fed. Rep. of Germany

[73] Assignee: Teroson G.m.b.H., Heidelberg, Fed. Rep. of Germany

[21] Appl. No.: 825,620

[22] Filed: Aug. 18, 1977

Related U.S. Application Data

[62] Division of Ser. No. 508,637, Sep. 23, 1974.

[30] Foreign Application Priority Data

Oct. 18, 1973 [DE] Fed. Rep. of Germany ....... 2352294

[51] Int. Cl.$^2$ .............................................. C03C 27/10
[52] U.S. Cl. .................................... 156/359; 156/109; 156/274; 156/380; 219/10.57
[58] Field of Search ............... 156/107, 109, 272, 273, 156/274, 275, 380, 499, 556, 364, 292, 359; 219/10.53, 10.57, 10.81; 65/58

[56] References Cited

U.S. PATENT DOCUMENTS

| | | | |
|---|---|---|---|
| 3,402,084 | 9/1968 | Jacobi et al. | 156/109 |
| 3,450,856 | 6/1969 | Buck et al. | 219/10.53 |
| 3,543,385 | 12/1970 | Javaux et al. | 65/58 |
| 3,574,031 | 4/1971 | Heller, Jr. et al. | 156/275 |
| 3,657,038 | 4/1972 | Lightfoot | 156/275 |
| 3,756,889 | 9/1973 | Wolfberg et al. | 156/380 |
| 3,852,149 | 12/1974 | Sitter et al. | 156/109 |
| 3,919,023 | 11/1975 | Bowsen et al. | 156/109 |

FOREIGN PATENT DOCUMENTS 80,298 5/1971 German Democratic Rep.

OTHER PUBLICATIONS

"Fabricating Wood", Electronics, Apr. 1944, p. 102.

*Primary Examiner*—Douglas J. Drummond
*Assistant Examiner*—Michael W. Ball
*Attorney, Agent, or Firm*—William L. Baker; C. E. Parker

[57] ABSTRACT

An improved method for preparing double or multiple pane insulating glass is described wherein the sealant employed to seal the glass and the frame is cured rapidly using capacitive high frequency heating.

4 Claims, 7 Drawing Figures

APPARATUS FOR RAPIDLY PRODUCING CEMENTED PANES OF INSULATING GLASS

This is a division, of application Ser. No. 508,637, filed Sept. 23, 1974.

The present invention relates to an improved process for producing insulating glass. Insulating glass is here understood to mean planar double or multiple panes arranged parallel to one another. Due to their better sound and insulation properties they are being increasingly used, so that an improved manufacture thereof is of great importance.

Generally spacers made from aluminium or iron plate connected together by means of annular brackets are placed in the form of a frame construction between the panes, so that the reciprocal spacing thereof does not change and the edge area is stabilized. In addition, the air gap is hermetically sealed from the ambient. The spacer frames are cemented to the panes by a hot extruded adhesive layer, e.g. of plastic butyl rubber, applied to both sides of the spacer. Misting of the inside of the insulating glass panes is prevented by filling the aluminium webs with a dehumidifying agent. The outer joints between the two panes and the aluminium web of the frame construction is then coated with an elastic sealing material which absorbs thermal expansions and contractions.

Whereas the tacky butyl rubber sprayed laterally onto the spacer frames remains plastic, the sealing material sprayed or trowelled into the outer joints hardens completely within a paticular period of time, i.e. within several hours, and after being left for a further period its surface becomes non-tacky. In each case the insulating glass manufacturer must carefully respect this period before the panes are dispatched to ensure that the double or multiple panes do not separate during transportation.

In order to reduce the time required for complete hardening some insulating glass manufacturers store the panes of insulating glass coming from the production line in temperature-controlled rooms at about 40° C. An even higher temperature in the rooms would lead to the advantage of a more rapid curing, but would simultaneously lead to the disadvantage that the air between the panes would be expanded to such an extent by the heating that the cement would become detached at the weakest point and air would be blown out at the resulting permanent leakage point.

An object of the invention is to provide a method for the accelerated curing of the elastic sealing material during the conventional insulating glass manufacturing process, wherein only the sealing material is heated but the pane of insulating glass remains cold in order to substantially eliminate the danger of separation of the panes.

In the present invention a rapid process is provided for producing insulating glass by cementing two or more panes to a spacer frame which can contain a dehumidifying agent and sealing the pane edge joints with a thermosetting sealing material. The pane edge joints are filled with the sealing material and are briefly heated by means of a capacitive high frequency heating to 40°–90° C. Optionally before or after the heating the sealing material is covered with aluminium foil as a vapour barrier. Preferably the capacitive high frequency heating is performed in the kHz to MHz range.

The sealing material used must be of the thermosetting type. Preferably two component systems are used which harden completely accompanied by cross-linking, e.g. polyurethane or polysulphide sealing materials whereby the cross-linking can be greatly accelerated by heating.

The process of the invention can be performed particularly advantageously if special sealing materials are used which strongly absorb electrical energy, and which contain components and/or additives with maximum $\epsilon$ and tan $\delta$ values. Such sealing materials form the object of my copending application Ser. No. 508,636 filed Sept. 23, 1974, now U.S. Pat. No. 3,936,412, the disclosure of which is hereby incorporated by reference. The sealing materials obtain the desired properties by using suitable basic polymers and plasticizers and/or by using fillers with a dielectric constant of $> 200$. Titanates, zirconates and stannates of barium, strontium, calcium, magnesium and lead, preferably barium titanate, are particularly suited to act as the fillers. These sealing materials absorb to an increased extent the energy from the alternating electric field which is converted into heat.

A futher object of the invention is an apparatus for producing insulating glass with mechanically or optically-electrically controlled conveying devices for the panes of insulating glass, mixing and spraying devices for applying the sealing material, as well as optionally an apparatus for covering the pane edge joints with aluminium foil, wherein the apparatus is characterized by at least two electrodes for the capacitive heating of the sealing material in the pane edge joints connected to a high frequency generator. Two pairs of electrodes can be arranged parallel to one another in such a way that two facing pane edge joints can be simultaneously heated. Frequently, however, it is more advantageous for the pairs of electrodes to be staggered relative to one another in the conveying direction because phase displacements could occur as a result of the metal spacer frames in the case of simultaneous capacitive heating of two facing pane edge joints. The electrodes are preferably arranged in a movable manner so that it is possible to adapt to the particular pane width.

There are various possibilities for the operation of the apparatus. It is firstly possible for the panes of insulating glass, and therefore their edge joints to be discontinuously or preferably continuously passed between stationary high frequency electrodes. However, it is also possible for the h.f. electrodes to be passed over the pane edge joints which again implies a discontinuous process.

After heating the sealing material of two facing pane edge joints, the heating of the two remaining joints takes place. For this purpose the conveying device must either be constructed in such a way that a 90° direction change of the panes takes place, followed by the panes being passed between further pairs of electrodes, or alternatively the conveying direction for the panes of insulating glass can be retained if in the device between the first two and the following two pairs of electrodes a rotary table is arranged which rotates the panes by 90°.

For the further explanation of the invention, reference should be made to the attached drawings wherein.

Figure 1:
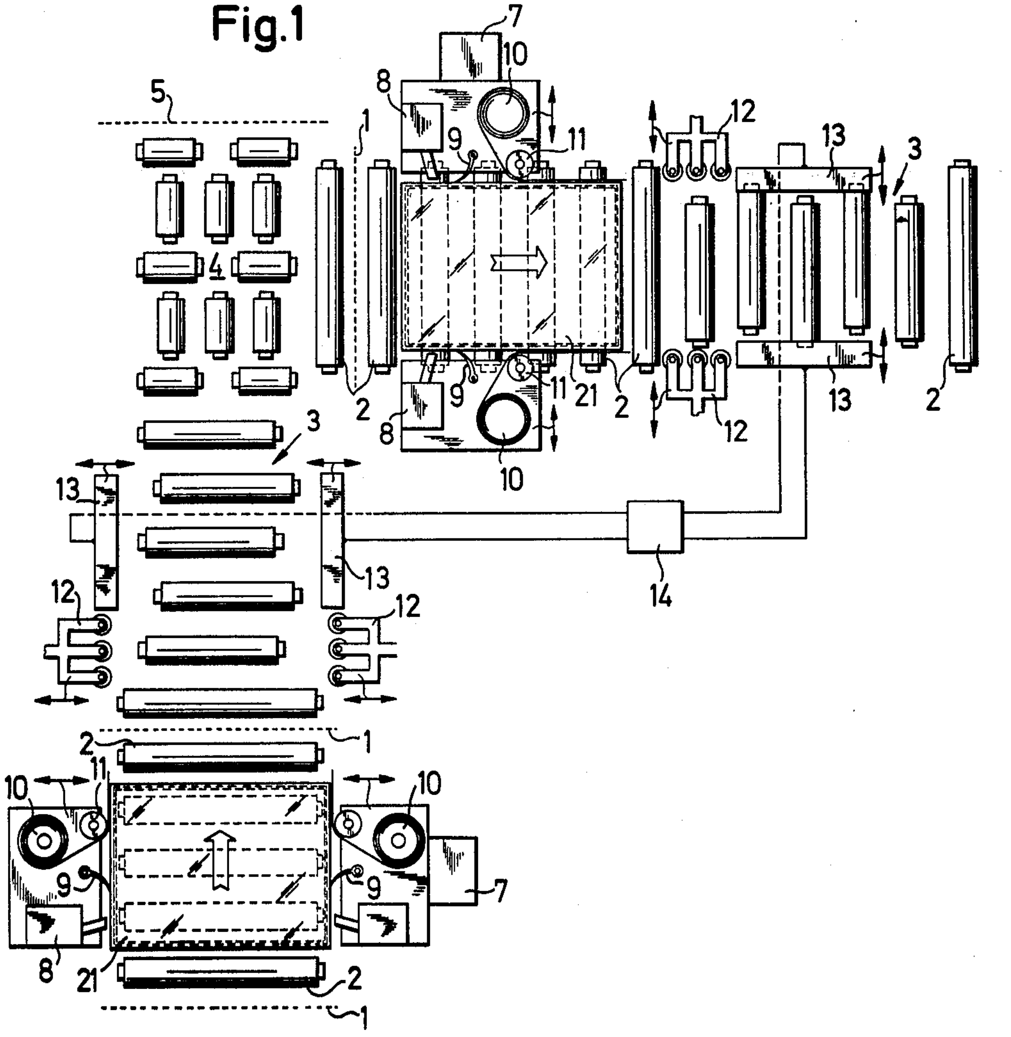
FIG. 1 is a schematic representation of the performance of the process according to the invention using the apparatus according to the invention.

The technical performance of the process can take place in such a way that the panes of insulating glass 21, which in the conventional manner are cemented with a spacer frame 22 which is generally filled with a dehumidifying agent, pass into the apparatus (starting at the left-hand bottom side of FIG. 1) on feed rollers or rollers 2, and are aligned by latterally positioned back-up rollers 12. The width of the panes is scanned by a mechanical or photo-electric contact barrier 1 and the value is transmitted to a roller table 3 whose width is adjustable. The width of the conveyor is such that the edges of the panes project approximately 15–20 cm over the rollers or rolls of table 3 parallel to the conveying direction.

The two components of the sealing material used are combined in a mixing plant 7. By means of a spraying device 8 the sealing material 24 is sprayed on both sides into the edge joints parallel to the conveying direction between the spacer 22 and the two or more panes 21. Excess material is removed with a stripper 9. The sealing material is covered with a thin aluminium foil 10 and pressed down with a roller 11. This outer aluminium layer serves as an effective water vapour diffusion barrier which delays misting of the space between panes, and simultaneously prevents the sealing material running out during the capacitive heating process. However, it can also be applied after heating.

The thus prepared edge joints now pass between a pair of electrodes 13 on either side which in each case are connected to a high frequency generator 14 of corresponding capacity and frequency. The length of the electrode rails and the distance between the same and the pane depend on the cross-linking duration of the sealing material, the feed rate for the panes and the electrical capacity of the h.f. generator.

After passing through the first group of electrodes the pane moves into a transverse conveyor 4. After making contact with a contact 5, conveying is briefly interrupted and then conveying continues perpendicular to the conveying direction hitherto used. In this second conveying path in which direction are directed two edge joints not yet filled with sealing material, the above-described process stages are repeated, i.e. aligning the pane on the conveyor belt, scanning the pane width, setting the spraying nozzle spacing, filling the joints, stripping the sealing material, covering the sealing material with a strip of aluminium foil and passage through a second group of high frequency electrodes on both sides having an adjustable width.

It must be ensured that the panes of insulating glass are well sealed with sealing material in the corners where the aluminium foils overlap so that the advantage of water vapour diffusion barrier is not lost through leaks.

Alternatively the conveying direction can be maintained if a rotary table for rotating the panes by 90° is arranged between the first and second feeding and hardening section; the remaining operating members of the apparatus and the process sequence remain substantially unchanged.

Figure 2A:
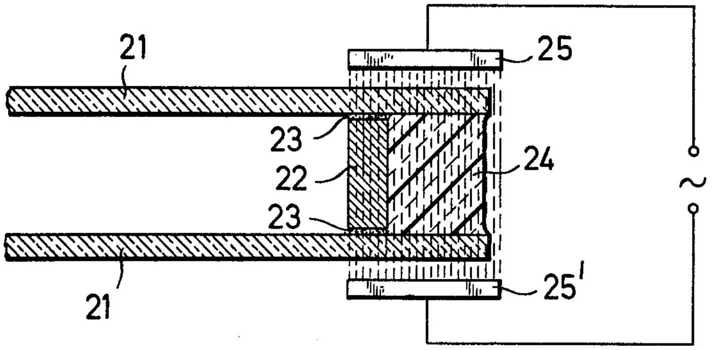
FIGS. 2–4 show various arrangements of the h.f. electrodes for the capacitive heating, FIGS. *2a–4a* being in cross section and FIGS. *2b–4b* in plan view.
Figure 2B:
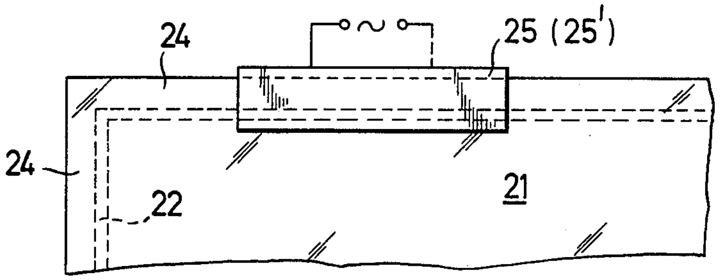
Figure 3A:
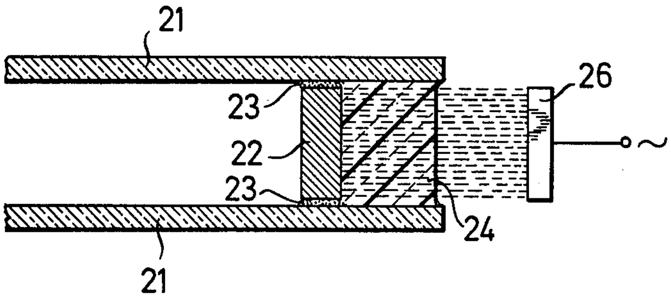
Figure 3B:
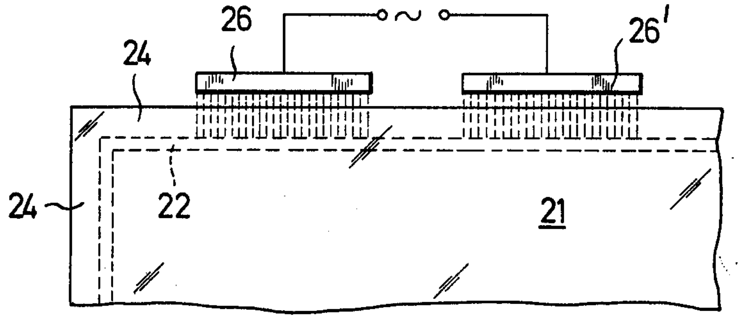
Figure 4A:
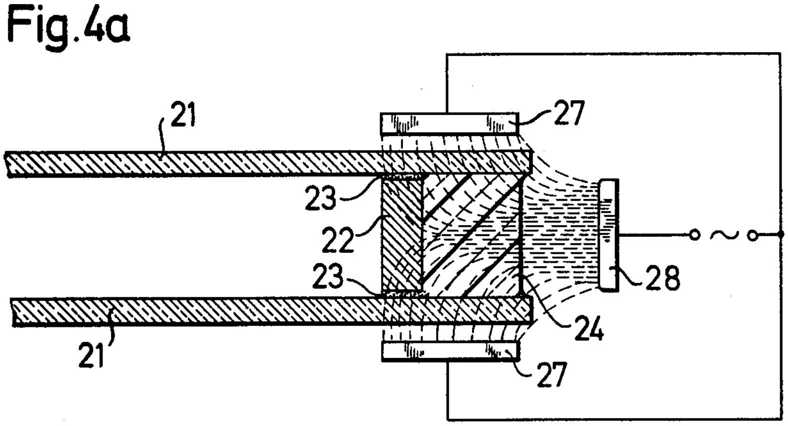
Figure 4B:
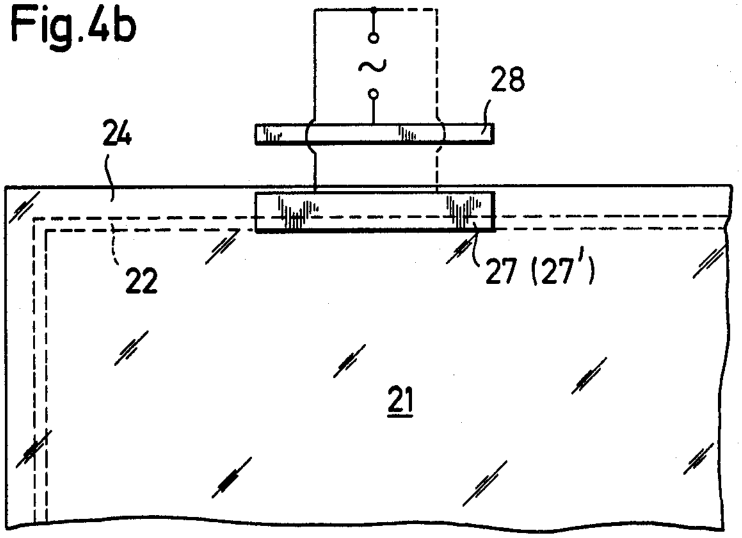

Various possibilities exist for the arrangement of the electrodes for capacitively heating the sealing mass in the pane edge joints. FIGS. 2–4 show particularly preferred arrangements.

The pane of insulating glass comprises in each case two parallel glass panes 21 of identical size which are separated from one another by a spacer 22. The frame-like spacer 22 is cemented to the glass panes 21 by means of a permanently plastic sealing material 23 having a low water vapour diffusion value. In the edge joint formed by the two glass panes 21 and the metal spacer 22 is located the sealing material 24 which must be completely hardened to give a permanent elastic seal.

According to the embodiment of FIG. 2 the h.f. electrodes 25 and 25' are arranged above and below the pane edge joint of the horizontal insulating glass pane. The pane of insulating glass which passes between the facing electrodes with the aid of the conveyor traverses with its edge area the alternating electric field maintained between the electrodes, so that as a result of the absorption of electrical energy heating of the sealing material 24 takes place.

In the embodiment of FIG. 3 the h.f. electrodes 26 and 26' are arranged sequentially and parallel to the edge of the insulating glass pane. The metal spacer 22 serves as a bridge for forming the necessary alternating electric field. In this embodiment the panes of insulating glass are once again preferably moved continuously past the electrodes.

A particularly favorable arrangement of the h.f. electrodes is shown in FIG. 4, wherein the h.f. electrodes 27 and 27', arranged above and below the edge joint of the insulating glass pane, are connected in parallel, whilst a lateral central electrode 28 serves as the counter-electrode. In this way a particularly dense alternating electric field is obtained resulting in rapid heating of the sealing material 24. This electrode arrangement is suitable both for a stationary apparatus wherein the insulating glass pane passes through the space between the electrodes and for a movable apparatus which can be moved along the edge joints of an insulating glass pane.

The particular advantage of the process according to the invention is that the panes of insulating glass are only heated in the edge area, wheras the air gap between the panes is scarcely heated. For this reason a hardening temperature above 40° C., e.g. a temperature of about 70° C., can be used without there being any danger of the intermediate air being blown out at the weakest cementing point. Therefore, on leaving the production plant after only standing for a short time the panes can be made ready for despatch which results in a considerable space-saving.

Without passing beyond the scope of the invention it is possible to make numerous changes in the process with horizontal pane conveying as regards the conveying devices, the adjustment of the electrode width and spacings, the filling with the sealing material and the arrangement of the electrode rails of the h.f. generator.

The following Examples serve to further illustrate the invention which by means of model tests illustrate the curing of a self-adhering sealing material for insulating glass.

EXAMPLE 1

A self-adhering polysulphide sealing material for insulating glass (Terostat 990, mixing ratio of components A:B — 10:1) with the addition of 4% of $BaTiO_3$ in component A, immediately after mixing was coated onto a polyethylene cup 12 mm high with a diameter of 30 mm, and with an electrode spacing of 25 mm was heated for 12 sec. by means of a 0.5 kW h.f. generator.

Initial temperature ($T_I$) = 31.5° C.
Final temperature ($T_{II}$) = 49° C.
% temperature increase $(T_{II} - T_I/T_I) \cdot 100 = 55.6\%$
a non-tacky state was reached after 60 minutes.
Shore A hardness after 3 hours — 18°–19°

Shore A hardness after 6 hours — 37°

EXAMPLE 2

The freshly mixed sealing material of Example 1 was coated onto polyethylene cups with the same dimensions, and with an electrode spacing of 20 mm was heated for 12 sec. with a 0.5 kW h.f. generator.

Initial temperature ($T_I$) = 33° C.
Final temperature ($T_{II}$) = 61° C.
% temperature increase $(T_{II} - T_I/T_I) \cdot 100 = 84.8\%$
a non-tacky state was reached after 40 minutes.
Shore A hardness after 3 hours — 25°–26°
Shore A hardness after 6 hours — 36°

EXAMPLE 3

The freshly mixed sealing material of Example 1 was coated onto polyethylene cups with the same dimensions, and with an electrode spacing of 20 mm was heated for 20 sec. with 0.5 kW h.f. generator.

Initial temperature ($T_I$) = 33° C.
Final temperature ($T_{II}$) = 83° C.
% Temperature increase $(T_{II} - T_I/T_I) \cdot 100 = 151.5\%$
a non-tacky state was reached after 6 minutes.
Shore A hardness after 3 hours = 26°
Shore A hardness after 6 hours = 36°

Without the h.f. heating according to the invention the sealing mass used in the three Examples only reached a non-tacky state after about 6 hours and after 18–20 hours reached a Shore A hardness of approximately 28°.

It is claimed:

1. An apparatus for producing sealed panes of insulating glass employing capacitive high frequency heating to cure the sealant, said apparatus comprising;
(a) a plurality of rollers for supporting and conveying at least two horizontally positioned superposed panes of glass, said panes having first and second pairs of opposed lateral edges and being separated by a spacer located near but back fron said lateral edges and creating therewith an open continuous channel defined by said lateral edges and said spacer for receiving sealant;
(b) a first means for applying sealant into the portions of said channel defined by said first pair of opposed lateral edges;
(c) two first pairs of separated electrodes, said pairs being spaced from one another and connected to a high frequency generator and adapted to impart heat capacitively to said sealant, one each of said pairs of electrodes being located generally adjacent a pair of opposed lateral edges of said panes making up said first pair of such edges and laterally movable in relation thereto in order that the separated electrodes of each of said pairs are positionable such that substantially only the said sealant receiving channel defined by said lateral edges is located between the electrodes;
(d) first means for optically scanning and determining the distance between said first pair of lateral edges defining said sealant-receiving portions of said channel and positioning the said first pair of electrodes in accordance with said determined distance such that substantially only the sealant receiving portions of said channel defined by said first pair of lateral edges is located between said electrodes;
(e) a second means for applying sealant into the portions of said channel defined by said second pair of lateral edges of said panes and said separator;
(f) two second pairs of separated electrodes, said second pairs also being spaced from another and connected to a high frequency gnerator and adapted to impart heat capacitively to said sealant, one each of said second pairs being located generally adjacent a pair of opposed lateral edges of said panes making up said second such pair and laterally movable in relation thereto in order that the separated electrodes of each of said second pairs is positionable such that substantially only the said sealant receiving channel defined by said second pair of lateral edges is located between the electrodes of said second pairs; and
(g) second means for optically scanning and determining the distance between said second pair of lateral edges defining said sealant receiving channel portions and positioning the said second pair of electrodes in accordance with said determined distance such that substantially only the said sealant receiving channel portions defined by said second pair of lateral edges is located between the electrodes of said two second pairs of electrodes.

2. The apparatus of claim 1 wherein said means for applying said sealant is adapted to apply said sealant in the form of a spray.

3. The apparatus of claim 1 additionally including means for applying a strip of impermeable foil to the surface of the sealant following its application to the said sealant receiving channel.

4. The apparatus of claim 1 including means for changing the direction of conveyance of said glass panes.

* * * * *